United States Patent [19]
Chen

[11] Patent Number: 5,279,730
[45] Date of Patent: Jan. 18, 1994

[54] AQUARIUM WASTE CLEANING DEVICE

[76] Inventor: Kuo-Chin Chen, No. 80 Alley 85 Lane 673 Chung Cheng Rd., Jen Te Hsiang, Tainan Hsuan, Taiwan

[21] Appl. No.: 90,875

[22] Filed: Jul. 9, 1993

[51] Int. Cl.$^5$ ............................................. A01K 63/04
[52] U.S. Cl. .................................. 210/169; 119/264; 15/1.7
[58] Field of Search .................. 210/169, 416.2; 119/5; 15/1.7

[56] References Cited

U.S. PATENT DOCUMENTS

| | | | |
|---|---|---|---|
| 2,614,529 | 10/1952 | Hanson | 210/169 |
| 2,765,275 | 10/1956 | Aaron | 210/169 |
| 2,899,063 | 8/1959 | Ellis | 210/169 |
| 2,956,507 | 8/1993 | Hutchinson | 210/169 |
| 3,630,364 | 12/1971 | Johnston | 210/169 |
| 3,734,853 | 5/1973 | Horvath | 210/169 |
| 4,094,788 | 6/1978 | Dockery | 210/169 |
| 4,257,893 | 3/1981 | Burton | 210/169 |
| 4,722,670 | 2/1988 | Zweifel | 210/169 |
| 5,048,140 | 9/1991 | Wu | 210/169 |
| 5,240,596 | 8/1993 | Chestnut | 210/169 |

Primary Examiner—Stanley S. Silverman
Assistant Examiner—Robert James Popovics
Attorney, Agent, or Firm—Pro-Techtor International

[57] ABSTRACT

An aquarium cleaning device comprising a sucking head and a filter disc welded with a bottom opening of the sucking head, and a stirring pipe protruding slantingly through the filter disc and having a tubular portion on the filtr disc to protrude in an upper tubular portion of the sucking head and a lower filter portion with many filter holes for water to flow through, a water lead pipe connected with the tubular portion and extending up out of an aquarium, a sucking ball connected with an outer end of the water lead pipe to be repeatedly compressed to suck and push the water in the aquarium through the sucking head and the filter disc and the stirring pipe to suck out waste mixed in the water.

1 Claim, 3 Drawing Sheets

AQUARIUM WASTE CLEANING DEVICE

BACKGROUND OF THE INVENTION

A conventional method for cleaning an aquarium is to drain the water in an aquarium and to wash several times the small stones placed in the aquarium or to accommodate a water cleaner in an aquarium. But fish waste and fish feed sink among stones and are not easily to be got ridden of by the water cleaner.

SUMMARY OF THE INVENTION

This invention has been devised to offer a kind of aquarium waste cleaning device of simple structure and easy use for getting rid of waste mixed in the water in an aquarium with no need of draining the water in the aquarium.

The aquarium waste cleaning device in the present invention comprises a sucking head, a filter disc combined with a lower open bottom of the sucking head. The sucking head has an upper tubular portion and a lower curved-down mask-shaped body with a bottom large opening. The filter disc is flat and oval, having a plurality of filter holes, welded with and closing the bottom opening of the sucking head. A stirring pipe is firmly attached with the filter disc, protruding inclinedly through the central portion of the filter disc, having an upper tubular portion on the filter disc, and a lower filter portion bored with many filter holes under the filter disc. A water lead pipe is provided, with its lower end connected with an upper end of the upper tubular portion of the sucking head and with its upper end extending out of an aquarium and connected with a hollow sucking ball capable of compression and inflation.

The sucking ball is to be continuously compressed to suck and push the water around the sucking head placed on small stones laid on the bottom of the aquarium to stir the water and the small stones placed on the bottom of the aquarium, forcing waste on the stones to float up from the upper surface of the stones or among the stones to be sucked partly through the stirring pipe and partly through an annular hollow space between the circumferential wall of the stirring pipe and the circumferential wall of the tubular portion of the sucking head. And then the water mixed with waste is sucked through the water lead pipe to the sucking ball to be exhausted out.

DETAILED DESCRIPTION OF THE INVENTION

Figure 1:
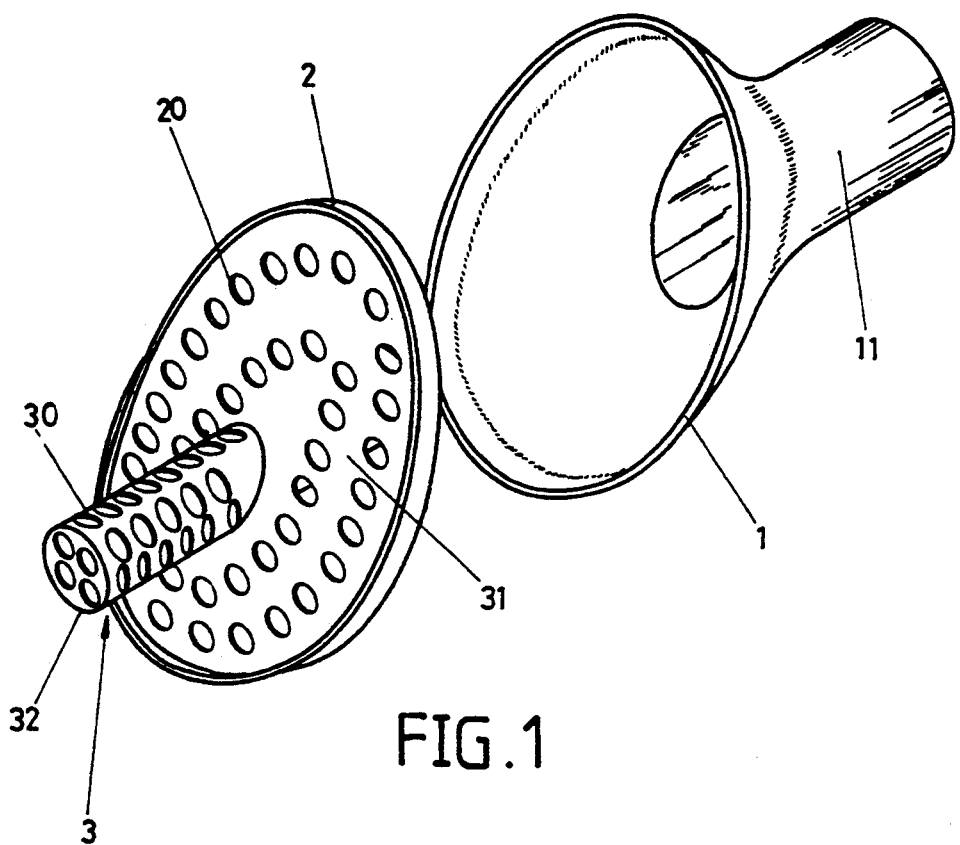
FIG. 1 is an exploded perspective view of an aquarium waste cleaning device in the present invention.
Figure 2:
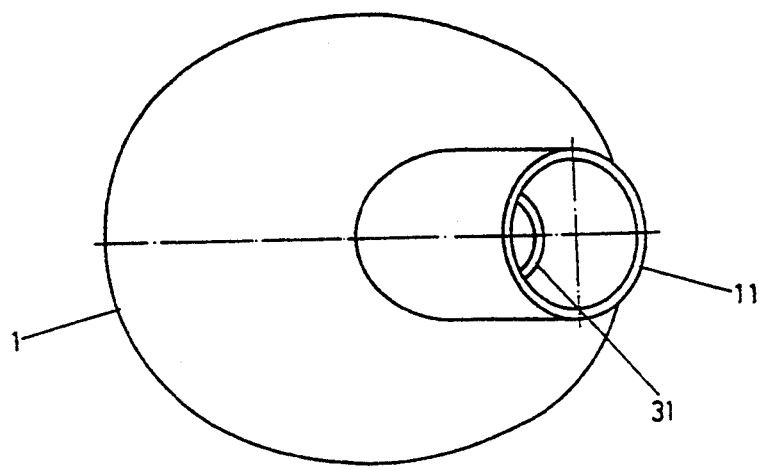
FIG. 2 is an upside view of the an aquarium waste cleaning device in the present invention.
Figure 3:
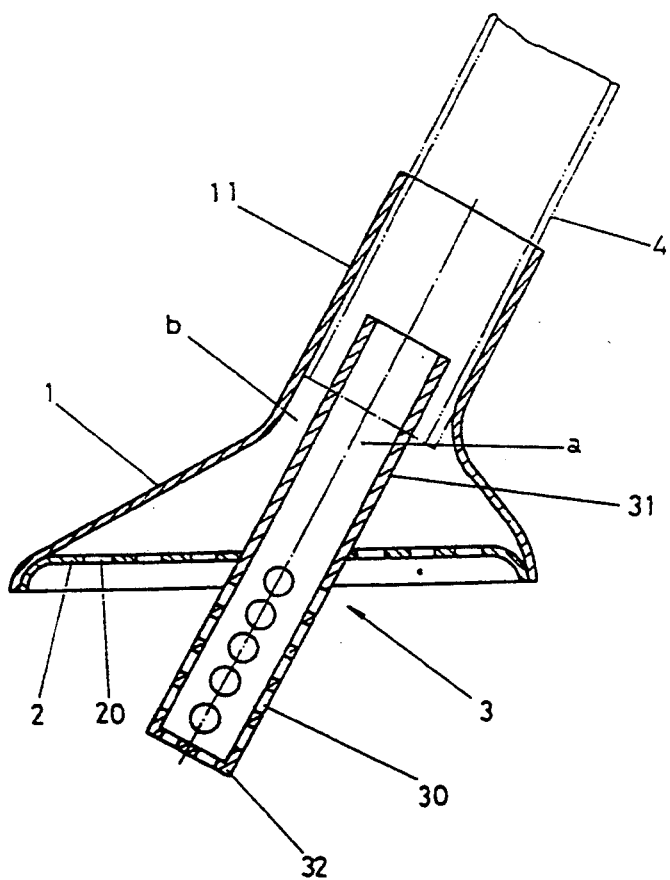
FIG. 3 is a side cross-sectional view of the aquarium waste cleaning device in the present invention.
Figure 4:
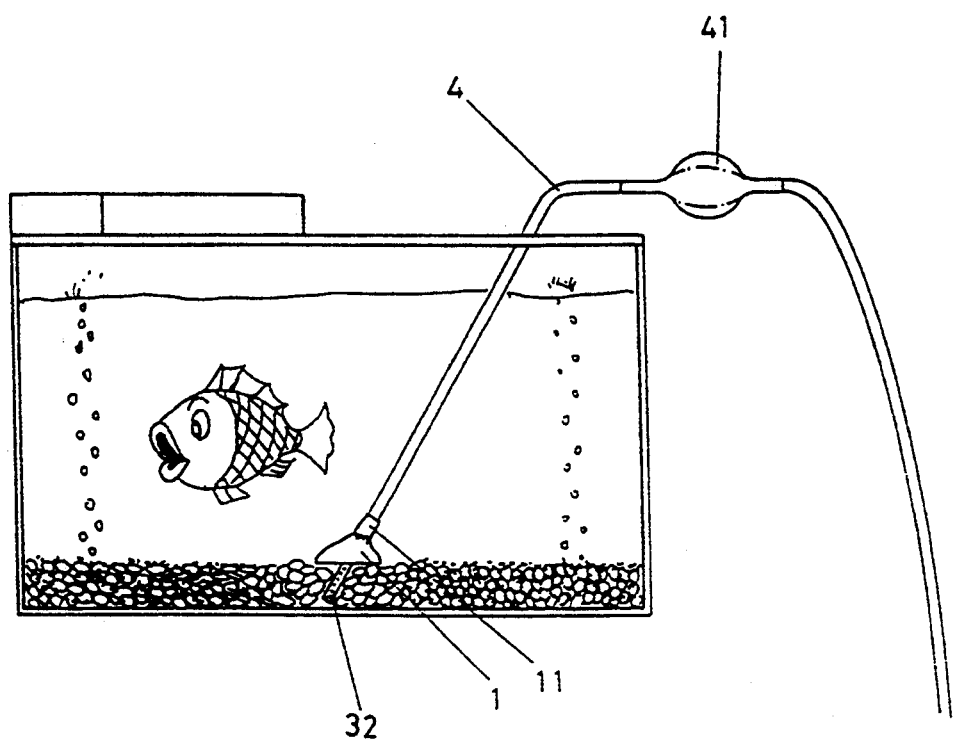
FIG. 4 is a perspective view of the aquarium waste cleaning device in the present invention applied to an aquarium.

An aquarium waste cleaning device in the present invention, as shown in FIG. 1, comprises a sucking head 1 and a filter disc 2 welded together with the sucking head 1, a stirring pipe 3 provided to pass slantingly through the filter disc 2, and a sucking ball 41 connected with the sucking head 1 with a water lead pipe 4.

The sucking heak 1 has a lower curved-down hollow maskshaped body, and an upper slanting tubular portion 11 and a bottom oval circumferential edge welded with an outer circumferential edge of the filter disc 2. The slanting tubular portion 11 extends upward slantingly and is connected firmly with a water lead pipe 4 which extends out of an aquarium and is connected with a sucking ball 4.

The filter disc 2 is shaped oval and bored with a plurality of filter holes 20 for water to flow through.

The stirring pipe 3 is provided to pass slantingly through the filter disc 2 and has an upper portion 31 on the filter disc 2 and a lower filter portion 32 under the filter disc 2. The lower filter portion 32 has many filter holes 30 in its circumferential wall and its bottom for water to flow through.

The stirring pipe 3 has its upper tubular portion 31 protruding in the tubular portion 11 of the sucking head 1 with no connection with each other, and the outer circumferential edge of the filter disc 2 is welded with the lower circumferential edge of the sucking head 1. So one sucking passageway, i.e. a first sucking passageway a is formed in the interior of the tubular portion 31 of the stirring pipe 3 and another sucking passageway b. i.e. a second sucking passageway, is formed between the wall of the upper tubular portion 11 of the sucking head 1 and the wall of the upper portion 31 of the stirring pipe 3.

The filter disc 2 is placed on an upper surface of small stones laid on the bottom of the aquarium, with the stirring pipe 3 protruding in the small stones. The sucking head 1 with the filter disc 2 and the stirring pipe 3, assembled together integrally, can be moved on the upper surface of the stones for cleaning waste therein. When the sucking ball 41 is compressed repeatedly, sucking and pushing the water in the aquarium through the water lead pipe 4 and the filter holes 20 and 30 of the filter disc 2 and of the lower filter portion 32 of the stirring pipe 3, the small stones may be stirred to let waste lying among the small stones float up. The floating waste with water is sucked up through the filter holes 20 in the filter disc 2 and through the first sucking passageway b. The waste hard to float up and lying between the stones and the bottom of the aquarium may be sucked through the lower filter portion 32 of the stirring pipe 3 and the tubular portion 31, i.e. the first sucking passageway a. In this way, the whole waste in the aquarium can be sucked out. In addition, the small stones can be prevented from flowing out together with water by means of the smaller size of the filter holes 20, 30.

What is claimed is:

1. An aquarium waste sucking device comprising;
   a sucking head having a lower curved-down mask-shaped body and an upper tubular portion extending upward slantingly from the mask-shaped body, and a lower oval circumferential edge around a bottom opening of the mask-shaped body;
   a filter disc shaped as flat and oval and having a plurality of filter holes and welded with the lower circumferential oval edge of said sucking head;
   a stirring pipe provided to slantingly protrude through the central portion of said filter disc, having an upper portion on said filter disc and a lower filter portion under said filter disc, said upper portion having a closed circumferential wall and protruding in said tubular portion of the sucking head, said lower portion having a plurality of filter holes in a bottom and the circumferential wall for water to flow through;

a water lead pipe connected with the upper end of said tubular portion of said sucking head and extending up to go out of an aquarium;

a sucking ball connected with an upper end of said water leading pipe, being compressed repeatedly to suck and push the water in an aquarium through the stirring pipe, the filter disc, the tubular portion of said sucking head and said water leading pipe; and the inner space of the upper portion of said stirring pipe forming a first sucking passageway for water to be sucked by said sucking ball, the space between the upper portion of said stirring pipe and the inner wall of said tubular portion of said sucking head forming a second sucking passageway for water to flow up sucked by said sucking ball, said first sucking passageway being for the waste lying under the small stones stirred and the bottom of the aquarium by the water pushed by said sucking ball to flow through upward, said second sucking passageway being for the waste lying on or among the small stones to flow up, and said filter holes in the filter disc and in the lower filter portion of said stirring pipe preventing small stones from passing through.

* * * * *